United States Patent [19]

Caskey et al.

[11] Patent Number: 4,929,259

[45] Date of Patent: May 29, 1990

[54] HOLLOW FIBER MEMBRANE FLUID SEPARATION MODULE FOR BORESIDE FEED

[75] Inventors: Terrence L. Caskey, Concord; Johnny L. Trimmer, Antioch; Janine L. Jorgensen, Clayton, all of Calif.

[73] Assignee: The Dow Chemical Company, Midland, Mich.

[21] Appl. No.: 309,756

[22] Filed: Feb. 9, 1989

[51] Int. Cl.$^5$ ............................................. B01D 53/22
[52] U.S. Cl. .................................... 55/158; 55/16; 55/68; 55/159; 210/321.81; 210/321.9; 210/500.23
[58] Field of Search .................... 55/16, 68, 158, 159; 210/321.79, 321.8, 321.81, 321.88, 321.89, 321.9, 500.23

[56] References Cited

U.S. PATENT DOCUMENTS

| | | | |
|---|---|---|---|
| 3,339,341 | 9/1967 | Maxwell | 55/16 |
| 3,422,008 | 1/1969 | McLain | 55/158 X |
| 3,616,928 | 11/1971 | Rosenblatt | 55/158 X |
| 3,698,560 | 10/1972 | Tapp et al. | 210/321.8 |
| 3,832,830 | 9/1974 | Gerow | 55/158 |
| 4,237,596 | 12/1980 | Hughes et al. | 55/158 X |
| 4,268,279 | 5/1981 | Shindo et al. | 55/16 |
| 4,352,736 | 10/1982 | Ukai et al. | 55/158 X |
| 4,367,139 | 1/1983 | Graham | 210/456 X |
| 4,380,460 | 4/1983 | Otstot et al. | 55/158 |
| 4,517,720 | 5/1985 | Otstot et al. | 55/16 X |
| 4,556,180 | 12/1985 | Manatt | 55/158 X |
| 4,565,630 | 1/1986 | Runkle | 210/321.89 |
| 4,578,190 | 3/1986 | Fowler | 210/321.89 |
| 4,666,469 | 5/1987 | Krueger et al. | 55/158 X |
| 4,689,255 | 8/1987 | Smoot et al. | 210/321.89 X |
| 4,720,342 | 1/1988 | Takemura et al. | 210/321.79 |
| 4,734,106 | 3/1988 | Gollan | 55/16 |
| 4,746,430 | 5/1988 | Cooley | 55/158 X |
| 4,758,341 | 7/1988 | Banner | 55/158 X |
| 4,770,778 | 9/1988 | Yokoyama et al. | 210/321.79 |
| 4,781,834 | 11/1988 | Sekino et al. | 210/321.88 |

FOREIGN PATENT DOCUMENTS

| | | | |
|---|---|---|---|
| 53-31828 | 9/1978 | Japan . | |
| 54-152681 | 12/1979 | Japan | 210/321.81 |
| 58-143805 | 8/1983 | Japan | 210/321.9 |
| 61-011110 | 1/1986 | Japan | 210/321.89 |
| 61-119273 | 6/1986 | Japan . | |
| 2198430 | 6/1988 | United Kingdom | 210/321.8 |

OTHER PUBLICATIONS

WO81/02683, published 10/1/81, Kopp, 210/321.81.

Primary Examiner—Robert Spitzer

[57] ABSTRACT

The invention is a fluid separation module with improved permeate flow characteristics. Such modules comprise a hollow fiber bundle, two tubesheets, a tubesheet support which encircles the bundle and is contacted with the outer edge of the inside of both tubesheets, a feed inlet, a permeate outlet, a non-permeate outlet, a core, and one or more baffles for channeling flow, wherein the baffles for channeling flow have one end embedded in the second tubesheet and the second end placed at a short distance from the first tubesheet, with the distance between the end of the baffles for channeling flow and the first tubesheet being sufficient to allow the permeate stream flowing along the baffles for channeling flow to flow to the permeate outlet.

31 Claims, 2 Drawing Sheets

HOLLOW FIBER MEMBRANE FLUID SEPARATION MODULE FOR BORESIDE FEED

BACKGROUND OF INVENTION

This invention relates to hollow fiber membrane fluid separation modules which are specially adapted for boreside feed of a mixture of fluid to be separated.

Hollow fiber membrane modules are commonly divided into two or three regions, wherein such regions are sealed so that fluid cannot communicate from one region to the other, except by passing the fluid through the bores of the hollow fibers or permeating the fluid across the walls of the hollow fibers. Generally, a hollow fiber membrane module comprises a bundle of hollow fibers arranged in a fashion such that each end of the hollow fibers are embedded in a resin matrix commonly referred to as a tubesheet or header. Such hollow fibers communicate through the tubesheets and are open on the opposite face of each tubesheet. The opposite face of the tubesheet means herein that face of the tubesheet which is opposite the bundle. Generally, the regions of a membrane separation module are divided by the tubesheets and seals about the tubesheets. In a shellside feed membrane module, the fluids to be separated are introduced into the module in the region between the tubesheets and the outside of the fibers, and the fluids which permeate through the hollow fiber membranes into the bores of the hollow fibers are removed at one or both ends of the hollow fibers in the regions adjacent to the opposite face of one or both tubesheets. The non-permeating fluids are removed from a region in the area between the tubesheets but outside of the fibers. Most commercial industrial fluid separation processes operate in this fashion.

In a shellside feed process, the region about the hollow fiber bundle is pressurized. In a bore side feed process, the mixture of fluids to be separated is introduced into one end of the membrane module adjacent to the opposite face of one of the tubesheets such that the mixture will flow down the bores of the hollow fibers through the tubesheet and into the region between the tubesheets. In the region between the tubesheets, the fluid which selectively permeates through the membrane is removed from the shellside of the membrane. Those fluids which do not permeate through the membrane exit into a region adjacent to the opposite face of the second tubesheet and are removed from that region. In this operation the pressure then is exerted on the faces of the tubesheets which are opposite the fiber bundle. The hollow fibers are also pressurized in this operation. As the tubesheets are usually comprised of a resinous material, significant bending, compressive, and sheer stresses are exerted on such tubesheets by this operation. This creates a problem with supporting the tubesheets and preventing them from collapsing in on the hollow fiber bundle.

A second problem in boreside feed is getting proper flow of the permeate on the shellside of the fibers. One of the driving forces in a membrane separation process is a concentration gradient across the membrane. As the mixture of fluids to be separated flows down the bores and the more selectively permeable fluids permeate through the hollow fibers, the concentration of the selectively permeable fluids along the hollow fibers is reduced and the concentration on the shellside of the selectively permeable fluids increases. This results in a lowering of the driving force. A third problem is that if the flow on the shellside of the membranes is not properly controlled, it will have areas of high concentration of the permeate fluid and flow to the exit ports may not occur in an efficient manner.

What is needed is a hollow fiber membrane fluid separation module which is adapted for boreside feed. What is further needed is such a membrane module which minimizes the stresses on the tubesheets. What is further needed is such a membrane module in which the flow of the permeate on the shellside is controlled to maximize the concentration gradients along the fibers, to prevent areas of high permeate concentration, and to enhance the flow of permeate on the shellside.

SUMMARY OF INVENTION

The invention is a fluid separation module comprising:
  A. a plurality of hollow fiber membranes, wherein the hollow fiber membranes are arranged in a bundle form and are adapted for the separation of one or more fluids from one or more other fluids;
  B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet:
  C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet:
  D. a tubesheet support means which comprises a cylinder which encircles the bundle wherein a first end is bonded to or embedded in the first tubesheet, and a second end is bonded to or embedded in the second tubesheet;
  E. a feed inlet means adapted for introducing a feed mixture of fluids to be separated into the bores of the hollow fiber membranes by contacting the feed mixture with the open hollow fiber membranes at the opposite face of the first tubesheet:
  F. a non-permeate outlet means adapted for removing the fluids, which do not permeate through the hollow fiber membranes, from the bore of the hollow fiber membranes at the opposite face of the second tubesheet: and,
  G. a means for removing the fluids which permeate through the hollow fiber membranes from the vicinity of the hollow fiber membranes.

In a preferred embodiment, the hollow fiber bundle is arranged about a core which communicates through the opposite faces of both tubesheets. In another preferred embodiment, the fluid separation module further comprises one or more means for channeling flow, such means being arranged to channel flow of permeate in a longitudinal direction parallel to the core toward the permeate outlet.

These hollow membrane separation modules provide for improved support of the resin tubesheet, thus reducing the bending and compression stresses on the tubesheets. In some preferred embodiments, the modules of this invention demonstrate improved permeate flow and demonstrate a more efficient recovery of permeate and non-permeate fluids.

DETAILED DESCRIPTION OF THE INVENTION

This invention relates to modules for separation of one or more fluids from one or more other fluids in which the separation is performed by transporting selectively one or more fluids across a membrane. In this invention, the membranes are in a hollow fiber form and the device is specially adapted for feeding the mixture to be separated down the bore or lumen of the hollow fiber. The bore or lumen as used herein refers to the portion of the fiber which is hollow in the center of such fiber.

The membrane modules of this invention can be used to separate one or more fluids from one or more other fluids where the fluids have different transport rates through or across the membrane. The fluids can be in the gas, vapor or liquid form. In one preferred embodiment, the modules of this invention are useful in separating one or more gases from one or more other gases. The mixture of gases to be separated preferably comprises at least one of the gases selected from the group consisting of oxygen, nitrogen, methane, hydrogen, and carbon dioxide. Examples of such gases being separated are hydrogen from light hydrocarbons, oxygen from nitrogen, nitrogen from methane, carbon dioxide from light hydrocarbons, and the like. In another embodiment, the fluids to be separated are liquids. In one preferred embodiment where the fluids to be separated are liquids, the material which is transported across the membrane is converted to a vapor, which permeates across the membrane and is removed from the module as a vapor. This separation may be referred to as membrane stripping or pervaporation. In this embodiment, volatile compounds, i.e. those with high vapor pressures under the separation conditions, such as chlorinated organics, hydrocarbons, and the like, are separated from less volatile liquids. Volatile compounds which may be removed from liquid mixtures include carbon tetrachloride, dichloroethane, methylene chloride, perchloroethane, benzene, and the like. Less volatile liquids from which the volatile compounds may be removed include water and mixtures of water and organics. In another embodiment, gases entrained or dissolved in a liquid may be removed from such liquids. Examples of such gases include oxygen, carbon dioxide, sulfur dioxide, hydrogen sulfide, and ammonia.

The hollow fibers are found in a bundle which comprises a plurality of fibers. Such bundle may take various shapes and be arranged in various wrapping patterns. Bundles of hollow fibers useful in this invention can comprise various shapes and fiber arrangements, including those disclosed in Mahon U.S. Pat. No. 3,228,876 and McLain U.S. Pat. No. 3,422,008, (relevant portions incorporated herein by reference). Preferably, the bundle is arranged in an organized fashion. In one preferred embodiment, the bundle is arranged in a cylindrical fashion with the ends of the fibers at each end of the cylindrical bundle. Such bundle is preferably an elongated bundle with the length being greater than the diameter. Preferably, the fibers in the bundle are arranged in either a parallel wrap fashion or a bias wrap fashion. In a parallel wrap fashion, the fibers all lie parallel to one another with each end of the fibers found at each end of the cylinder of the bundle. In a bias wrap fashion, the fibers are wrapped in a crisscross pattern at a set angle, thus holding the fibers in place. In the bias wrap pattern, the ends of the fibers are located at the end of the bundle. The hollow fibers are generally formed from a polymeric material which is capable of separating one or more fluids from one or more other fluids. The methods for preparing such hollow fibers are well known in the art.

The materials which may be used to prepare the hollow fiber membranes include olefinic materials, such as poly-4-methylpentene, polyethylene, polypropylene; cellulosic esters and regenerated cellulose; polyestercarbonates; polycarbonates, including ring substituted versions of bisphenol based polycarbonates; polysulfones; polyimides; polyethersulfone; and the like. The hollow fiber membranes may be homogeneous, asymmetric, or composite membranes. The membranes may have a dense discriminating region which separates one or more fluids from one or more other fluids based on differences in solubility and diffusivity of the components in the dense region of the membrane. Alternatively, the membrane may be microporous and separate one or more fluids from one or more other fluids based on relative volatilities or contact angles of the fluids. The microporous membranes are preferred for membrane stripping applications. Membranes with dense regions are preferred for gas separations. The asymmetric membranes may have the discriminating region either on the outside of the hollow fiber, at the lumen surface of the hollow fiber, or located somewhere internal to the hollow fiber structure. In that embodiment where the discriminating region of the membrane is internal to the membrane structure, the lumen surface and the outside surface of the membrane are porous, yet the membrane demonstrates the ability to separate gases. In the embodiment wherein gases are separated, the preferred membranes include polyestercarbonate, polysulfone, aromatic polyimide, and polycarbonate based membranes. More preferred membranes are the polycarbonate based membranes. In one preferred embodiment such membranes are prepared by the process described in U.S. Pat. No. 4,772,392 (relevant portions incorporated herein by reference). In the embodiment wherein the modules are used for membrane stripping, the hollow fibers preferably are microporous and are comprised of a polyolefin or a fluorinated polyolefin, such as polyethylene, polypropylene, poly-4-methylpentene, fluorinated polyethylene, or copolymers and blends thereof.

About each end of the bundle is a tubesheet. The tubesheet functions to hold the hollow fibers in place and to separate the membrane module into three different regions. Such regions include the feed inlet region wherein the mixture of fluids to be separated is introduced into the hollow fiber membranes. The second region is the region between the tubesheets wherein a portion of the fluids fed down the bores of the hollow fiber membranes permeate across the membranes into the shellside of the membranes. The third region is the non-permeate outlet region, into which the fluid flowing down the bores of the hollow fiber membranes which does not permeate across the membranes flows and from which such fluid is removed. The tubesheet may be comprised of a thermoset or thermoplastic resinous material. Such material should be able to form a fluid tight seal around the hollow fibers and casing. In some embodiments, it is preferable that such thermoset material be able to bond to the fibers and to the tubesheet support means. If a core tube is used, the tubesheet is formed about the core tube. The hollow fibers in the bundle communicate through the tubesheet, and the face of the tubesheet opposite the bundle is opened such that the bores of the hollow fibers are opened to the region adjacent to such face, thereby allowing communication of fluid from such region into and out of said hollow fibers. Most of the tubesheet comprises a composite of the hollow fibers embedded in the resin material. The tubesheet can be any shape which performs the functions described hereinbefore. Preferably, the tubesheet is a circular tubesheet with sufficient width to provide support for the fibers and to withstand the pressures exerted on the tubesheets during operation. The portion of the tubesheet outside of the bundle may be built up for various purposes depending upon the design of the module. This portion of the tubesheet may be solely resin or may be made from a resin impregnated cloth which is wrapped around the outer portion of the tubesheet.

Examples of such materials useful as resins for tubesheets include artificial and natural rubbers, phenolaldehydes, acrylic resins, polysiloxanes, polyurethanes, fluorocarbons, and epoxy resins.

In the embodiment where the module is used for gas separations, the tubesheets are preferably prepared from epoxy resins. Any epoxy resin which adheres to the hollow fiber membrane and provides stability to a hollow fiber membrane device once cured in the manner described hereinafter can be used in this invention. Polyepoxide resins which are desirable for the resin formulations of this invention include glycidyl polyethers of polyhydric phenols.

Illustrative of the polyhydric phenols are mononuclear phenols and polynuclear phenols, and included within the latter are the phenol-aldehyde condensation resins commonly known as novolac resins. Typical mononuclear phenols include resorcinol, catechol, hydroquinone, phloroglucinol, and the like. Examples of polynuclear phenols include 2,2 bis(4-hydroxyphenyl)propane(bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxyphenyl phenyl sulfone, and the like.

The preparation of such resins is well known and is described in a number of patents such as U.S. Pat. No. 2,935,488 and others, and in textbooks such as Lee and Neville, *Handbook of Epoxy Resins*, McGraw-Hill Book Co., 1967 (both incorporated herein by reference).

Preferred epoxy resins are those resins derived from bisphenol A, e.g., diglycidyl ethers of bisphenol A. Such preferred resins generally correspond to the formula:

wherein n is a positive real number of between about zero and 6, more preferably between about zero and 4, more preferably between about zero and 1.5. In the discussion hereinafter, all parts with respect to the resin formulation will be based on 100 parts by weight of the epoxy resin (parts per hundred parts of resin, phr).

The epoxy resin is cured with a curing agent known to those skilled in the art. Preferred curing agents include polyfunctional amines, e.g., aromatic diamines, or mixtures or adducts thereof, and 2,4-dialkylimidazoles. Typical amines include m-phenylene-diamine, methylenedianiline, mixtures (including adducts) of m-phenylenediamine and methylenedianiline, diaminodiphenylsulfone, 4-chlorophenylene diamine, and the like.

An optional third component of the tubesheet resin composition is an epoxy curing catalyst. Any known epoxy curing catalyst which enhances the curing of a polyglycidyl ether of a polyhydric phenol with the curing agent may be used. Such catalysts are generally used in catalytic amounts, that is, amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin, and most preferably between about 1 and 2 parts per hundred parts of resin. Preferred catalysts are tertiary amines, for example, benzyldimethylamine, N,N,N',N'-tetramethylbutanediamine, dimethylaminopropylamine, N-methylmorpholine, N-triethylenediamine, and the like. Generally, where the curing agent is amine based a catalyst is not necessary.

In the embodiment wherein the module is used for membrane stripping, the tubesheet preferably comprises the epoxy resins described hereinbefore or polyurethanes.

The tubesheets support means comprises a means which functions to support the outer edge of the tubesheets and to prevent or reduce stresses due to bending and compression as a result of pressurizing the outside faces of the tubesheets. The tubesheet support means is preferably a cylinder which surrounds the outer portion of the hollow fiber bundle and is bonded about the tubesheet with a resin. Any resin which adheres the tubesheet to the tubesheet support and has sufficient modulus to maintain the bond under normal operating conditions is useful for forming such a bond. Included in the resins which may be used to form such a bond are the resins which may be used to form the tubesheets. The support means may surround a portion of the tubesheet and be bonded thereto or the support means may be embedded in a tubesheet which is built up around the support means. The tubesheet support means may be made of any material which provides sufficient support to prevent or reduce the compression stresses and bending stresses on the tubesheet and to prevent the tubesheets from collapsing in on one another. Such materials may include high strength plastics or composites and metals; metals are preferred. Examples of metals which may be used include aluminum or steel. The tubesheet support means must contain one or more ports or openings so as to allow the permeated gas to leave the membrane module or the bundle area. In one preferred embodiment, the module is designed such that the tubesheet support means functions as a casing about the hollow fiber membrane bundle portion which is between the tubesheets. In the embodiment where the tubesheet support also functions as a casing for the bundle, it is preferable that the material used to fabricate the tubesheet support be substantially impermeable to the fluids to be separated.

The membrane modules of this invention further comprise a feed inlet means. Generally this is a port or a fitting which allows introduction of the mixture of fluids to be separated into the module. In a bore fed module, the feed inlet means is found at one end of the module such that the feed can be introduced into the bores of the fibers. Such feed inlet means is found in the vicinity of the opposite (outside) face of the first tubesheet. Preferably, the module is designed such that there is a region or cavity, a feed inlet region, which is sealed to prevent fluid communication with the outside or with the region between the tubesheets and outside the fibers. Such region functions as a pressure vessel and the feed inlet means introduces the feed fluids into such region. Such region communicates with one end of the hollow fiber membranes, thus allowing the fluids to be separated to flow into and down the hollow fiber membranes.

The non-permeate outlet means is adapted for removing the fluids which do not permeate through the hollow fiber membrane from the membrane module. The fluids which do not permeate through the membrane exit the bores of the hollow fibers at the end opposite that end to which the feed composition is introduced. Preferably, the exiting fluids enter a non-permeate outlet region. Such region is adjacent to the opposite (outside) face of the second tubesheet, and is sealed such that fluid cannot communicate with the outside of the membrane device and the area between the tubesheets which is outside the hollow fiber membranes. This area is generally a cavity defined by the rest of the membrane device. The permeate outlet means can be a port or a nozzle which is connected with some means of removing the non-permeate.

The means for removing the fluids which permeate through the membrane from the vicinity of the membrane is either a port or a nozzle adapted for withdrawing the permeate from the vicinity of the membranes. In one embodiment, it is preferable that such means be located near the end of the membrane module to which the feed mixture is introduced. Such a location of the permeate outlet means results in countercurrent flow of the feed mixture with relationship to the flow of the permeate mixture, which enhances the concentration gradient along the hollow fiber membranes and improves the recovery and productivity of the membrane device.

In those embodiments where a core is used, such a core has arranged about it the hollow fiber membrane bundle, and the core is arranged such that it extends through and is bonded to both the first and second tubesheet. The core functions to provide support for the two tubesheets to keep them from collapsing upon one another during operation and further functions to support the bundle hollow fiber membranes which are arranged about it. The core can either be a rod, a solid tube, or a perforated tube, provided the core has sufficient mechanical strength to support the hollow fibers and the tubesheets. In some embodiments, it is desirable to introduce a sweep fluid to the shell side of the hollow fibers to aid in the removal of permeated fluids from the vicinity of the hollow fibers. One method of introducing a sweep fluid is to equip one end of the core with a sweep inlet means, adapted for introducing a sweep fluid into the core. In this embodiment the core is perforated in the vicinity of the hollow fiber bundle such that the sweep fluid enters the hollow fiber bundle. The core tube is preferably solid where it passes through the feed inlet region and non-permeate outlet region. In one more preferred embodiment where a sweep fluid is used, the core is perforated at one end of the portion located between the tubesheets. In one such preferred embodiment, that end is adjacent to the second tubesheet, opposite the feed inlet end, which aids in countercurrent flow. In the embodiment where no sweep fluid is used, it is preferred that the core either be a solid tube or a solid rod. The core may be made of any material which has sufficient mechanical strength to provide the desired support. The core may be comprised of a plastic, a composite, or a metal. Preferably, the core is comprised of a metal, for example, aluminum or steel.

In one preferred embodiment, the entire membrane module is placed in a casing. The casing functions to protect the outside of the membrane device and to contain or seal the membrane device from the outside environment. Further, the case is arranged about the tubesheet in such a fashion that a seal is formed between the first tubesheet and the casing and the second tubesheet and the casing, such that a fluid cannot communicate across or through the seal so as to divide the membrane device into three distinct non-communicating regions, the first region being the feed inlet region, the second region being the region between the tubesheets and outside of the hollow fibers, and the third region being the non-permeate outlet region. The seal is formed by any means which would provide a seal between each of the tubesheets and the casing. In a preferred embodiment, a groove is machined in each of the tubesheets about the outside circumference of said tubesheets, and an O-ring is then fit into that groove and placed against the outside of the case so as to form the appropriate seal. In one embodiment, the casing is a cylinder open at both ends of appropriate size to cover and protect the membrane module, yet close enough in circumference to the circumference of the tubesheet such that a seal can be formed with a sealing means between the tubesheet and the inner wall of the casing.

The casing may comprise any material which is capable of protecting the membrane module. In those embodiments wherein it is desirable to collect or control the permeate gas, such material should prevent the transmission of fluids through the casing. Preferably, the material is either a plastic, plastic composite, or metal, more preferably a metal such as aluminum or steel.

Preferably, where the casing is open at both ends, at each end of the casing there are end capping means which are arranged for sealing the end of the casing means near the tubesheet to form regions adjacent to the opposite faces of the tubesheets which are opened to the hollow fibers. The region adjacent to the outside face of the second tubesheet is the non-permeate outlet region. Such end capping means are fastened to the casing in a manner such that a seal is formed to prevent fluid communicating between the outside and the feed inlet region or the outside and the non-permeate outlet region. In a preferred embodiment, the end capping means is an endplate which is fastened by a fastening means to the casing. Such endplate may be fastened by providing a method of bolting the endplate directly into the casing. The casing may have arranged about it or bonded to it an attachment means adapted for attaching the end capping means to the end of the casing. Each end of the casing may have arranged around its outside a flange to which the endplate may be fastened. In one embodiment, the flange may be formed by building up the tubesheet. In another embodiment, a separate flange may be bonded about the tubesheet, the casing, or tubesheet support means, or both the tubesheet and casing or tubesheet support means. In another embodiment, a slip flange may be placed about the casing or tubesheet support means. In this embodiment, the tubesheet is built up such that the slip flange is held on the membrane device. The end capping means is affixed to the flange which is held on the module by the built up tubesheet.

In the embodiment where a casing means is used, the tubesheet support must be constructed and arranged to allow the permeate stream to pass from the hollow fiber bundle to the permeate outlet means. Preferably this is accomplished by placing a set of holes or perforations in the tubesheet support means. Such holes or perforations are preferably located in the end of the tubesheet support means near the first tubesheet.

In another embodiment, the tubesheet support means functions as a casing for the hollow fibers. In such embodiment the permeate outlet means is located on such support means. In this embodiment, an attachment means is arranged about the tubesheet support means for attaching an end capping means to the tubesheet support means, the tubesheet, or both. In one embodiment, the attachment means may be bonded to the tubesheet, tubesheet support means, or both. Such an arrangement is found on each end of the device with respect to both the first and second tubesheet. In a preferred embodiment, such attachment means is a flange. The end capping means at each end is fastened to the attachment means via some fastening means. In the embodiment where the attachment means is a flange and the end capping means is an endplate, the fastening means may be any means which would attach a flange to an endplate, for example, bolts. The use of the tubesheet support means to function as a casing for the hollow fibers is advantageous as it cuts down on the hardware necessary for preparing a membrane device and could significantly reduce the cost of such membrane device.

In another preferred embodiment, the membranes of this invention contain means for channeling flow, and such means is arranged to channel flow of permeate in a longitudinal direction parallel to the tubesheet support means. In the embodiment wherein a sweep fluid is introduced to the hollow fiber bundle via the core, it is preferable to have at least two means for channeling flow. One means for channeling flow encircles the outside of the hollow fiber bundle and has its first end attached and sealed to, or embedded in, the second tubesheet such that the permeate fluid cannot exit the module near the second tubesheet. In one embodiment, the second end of the said means for channeling flow is located a short distance from the first tubesheet, wherein the distance between the second end of the means for channeling flow and the first tubesheet is sufficient to allow the permeate stream and sweep fluid to flow to the permeate outlet means wherein such flow occurs near the first tubesheet. In another embodiment, this first means of channeling flow can be embedded in both tubesheets. In this embodiment, some means of allowing the flow of fluid from the hollow fiber bundle to the permeate outlet means is incorporated in the means of channeling flow. Preferably the means for allowing the flow of fluid to the permeate outlet means are holes or perforations in the flow channeling means. Such holes or perforations are located near the end embedded in the first tubesheet. This means for channeling flow functions to encourage countercurrent flow of the fluid mixture to be separated down the bores with relation to the flow of the permeate stream and the sweep fluid. The one or more other means for channeling flow are located within the fiber bundle. The first end of such means for channeling flow is located near the second tubesheet, such that the distance between the second tubesheet and the interior means of channeling flow is sufficient to allow the sweep fluid to flow into the flow channels created by the interior means for channeling flow. The second end of such interior means for channeling flow is located near the first tubesheet, wherein the distance between the second end and the first tubesheet is sufficient to allow the permeate stream and sweep fluid to flow to the permeate outlet means. Such interior means of channeling flow function to maintain countercurrent flow throughout the module and to control permeate concentration in the module. In the embodiment where no sweep fluid is used, such interior means for channeling flow preferably have one end embedded in the second tubesheet and the second end placed at a short distance from the first tubesheet, said distance between the end of the means for channeling the flow and the first tubesheet being sufficient to allow the permeate stream flowing along the means for channeling flow to flow to the permeate outlet means. This means for channeling flow functions to force the permeate to flow in a direction countercurrent to the direction that the feed mixture is flowing down the bore of the hollow fibers. Such countercurrent flow results in reducing the concentration of the permeated fluid in the region nearest the second tubesheet, thus maintaining a greater concentration gradient across the entire membrane surface. The actual distance between the end of the means for channeling flow and the first tubesheet is not critical, provided sufficient room is provided between the end of the means for channeling flow and the tubesheets to allow the permeating gas to be withdrawn by the permeate outlet means. This results in an improved recovery and productivity for the module. The means for channeling flow may, in one preferred embodiment, be a series of baffles. Such baffles may be arranged as concentric tubes parallel to the core tube, if present, and the tubesheet support means. Optionally, such baffles may be formed in a spiral fashion beginning at the core tube and ending near or at the tubesheet support means. The number of baffles which may be present is that number which provides sufficient channeling of the permeate stream to maintain a countercurrent flow. The baffle length should be sufficient to promote countercurrent flow along the major part of the length of the hollow fibers.

The modules may be constructed using processes well known in the art. The fibers used can be prepared by processes well known in the art. Generally, in module construction the fibers are formed into bundles; such bundles may be of suitable shape for membrane processing; preferred bundle arrangements involve either parallel laying down of fibers or the laying down of fibers in a bias wrap fashion. The tubesheets may be formed about the ends of the fiber bundles either simultaneously with laying down the fibers, such as by dripping resin along the fibers as the fibers are laid down. Alternatively, the bundle may be formed and then the tubesheet may be formed about each end of the bundle by centrifugal casting or potting techniques; such techniques are well known in the art. In those embodiments where it is desirable to build up the tubesheet to a circumference larger than the circumference of the hollow fiber bundles, the following procedures may be used. Where the tubesheet is formed after the formation of the bundle, the casting or potting technique would involve using appropriate vessels to form a larger circumference tubesheet. In that embodiment where the tubesheet is formed as the fibers are being laid down, once all the fibers have been laid down, the tubesheets may be built up by a variety of methods. One such method is to continue to wrap resin and impregnated cloth around the end of the tubesheets or circumference of the tubesheets and provide further resins so that the tubesheets are built up; thereafter, the resin and the built up portion may be cured. In those embodiments where baffles are used, the baffles are put in at the same time that the fiber is being laid down. If the baffles are placed in spiral or jelly roll configuration, the baffles are placed around the fibers as the fibers are laid down. Alternatively, if the baffles are of a concentric cylinder arrangement, then a portion of the fibers are laid down, the baffle is placed over the fibers, and then further fiber layers are put down until the next baffle is to be put on. This is continued until the module is completed. Once the tubesheets, baffles, and fibers have all been assembled, then the tubesheet support means is placed about the outside of the hollow fiber bundle and either bound to the tubesheet using a resin, or the tubesheet is built up around the end of the tubesheet supporting means. In one embodiment where the tubesheet support means is bonded to the tubesheet, the following procedure is used. With the tubesheet support means on end, the module comprising the tubesheet and hollow fiber bundle is inserted into the tubesheet support means, caulking is packed into the space between the tubesheet support means and the tubesheet at a depth of about three to four inches. A fast setting resin is used to wet the caulking, forming a sealed annular groove. Thereafter, the bonding resin is poured into the groove, bonding the tubesheet to the groove. After the resin is cured, the device is rotated end for end and the remaining tubesheet is bonded in the same fashion. Certainly other methods of bonding could be used. In another embodiment, the bundle and tubesheet support means about the bundle are placed in a mold and a tubesheet is formed about both elements. Where it is desired that the tubesheet support means not communicate through the entire tubesheet, the tubesheet support means may be suspended in the mold with such means being placed at the desired depth in the tubesheet. This method of bonding the tubesheet support means can be used either where the tubesheet is to be built up around a previously formed tubesheet or where the entire tubesheet structure is to be formed via molding.

It is conceivable that the tubesheet could be potted and placed inside of the tubesheet support means, forming the tubesheet and the bond between the tubesheet and the tubesheet support means in one step. Once the tubesheet support means is bonded to the tubesheet, then an attachment means is bonded to the tubesheet support means, the tubesheet, or both, which is adapted for attaching the endplates thereto. In one embodiment, a flange is welded to the tubesheet support means or bonded to the tubesheet via a resin, or both. Thereafter, the endplates are attached to such flange. Where necessary, gaskets are placed between the flange about the tubesheet and the endplate so as to insure the fluid sealing characteristics. Alternatively, slip flanges may be used as described hereinbefore.

In that embodiment wherein a case is placed about the entire module, a groove is machined in the outer circumference of each of the tubesheets, an O-ring is placed in such a groove, and the case is placed over the membrane module. Thereafter, the end capping means or endplates are fastened to the end of the membrane module. Note that prior to putting the flanges on or putting the case over the module, the faces of the tubesheets opposite the hollow fiber bundle are machined so as to open the ends of the hollow fiber so as to allow introduction of fluid into and withdrawal of fluid from such hollow fibers.

In the embodiment wherein a sweep fluid is used, the sweep fluid may be any fluid which aids in the removal of the permeate from the shell side. The sweep fluid can be a liquid, vapor, or gas. In a gas separation or membrane stripping separation, the sweep fluid is preferably a gas. Preferred gases include air, nitrogen, and the like.

Figure 1:
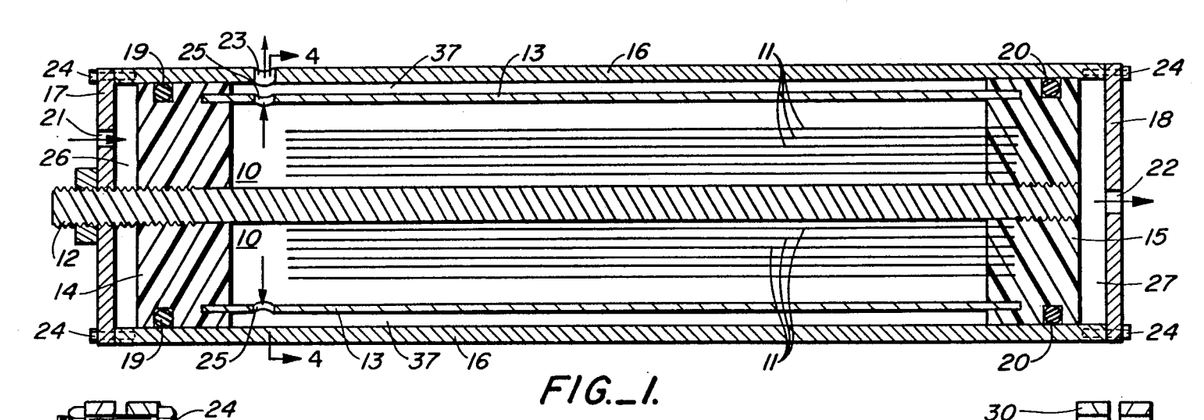
FIG. 1 demonstrates a schematic drawing of a preferred embodiment of this invention wherein the module is enclosed in a case.

The following descriptions of preferred embodiments as illustrated by the figures are provided to further illustrate the invention. FIG. 1 demonstrates a hollow fiber membrane module of the invention wherein the entire module is placed within a casing. The module comprises a bundle of hollow fibers (10) (the hollow fibers are not shown to make the drawing easier to read), interspersed in such a bundle of hollow fibers (10) is a series of baffles (11), which is a series of hollow cylinders interspersed among the fiber bundle (10) and being arranged in a parallel fashion to the core tube (12) and the tubesheet support means (13). The core tube (12) extends through the first tubesheet (14) and the second tubesheet (15) and is bonded thereto, further the fiber bundle is arranged about and supported by said core tube (12). Arranged about the hollow fiber bundle (10) is the tubesheet support means (13), which is further bonded to each of the tubesheets (14) and (15). The tubesheet support means (13) is arranged to support such tubesheets (14) and (15). Encircling the entire bundle (10) and tubesheets (14 and 15) is a case (16), at the end of the case nearest the first tubesheet (14) is a first endplate (17), such endplate adapted for sealing one end of the module case (16). In the vicinity of the second tubesheet (15) at the end of the casing (16) is a second endplate (18), said endplate (18) adapted to seal the second end of the casing (16). Seated in a groove in the first tubesheet (14) is an O-ring (19) which adapted to form a seal between the first tubesheet (14) and the casing (16). Seated in a groove in the second tubesheet (15) is a second O-ring (20) which is adapted for forming a seal between the second tubesheet (15) and the casing (16). In the first endplate (17) is found a feed inlet port (21), which is adapted for introducing into the membrane device a mixture of gases to be separated. In the second endplate (18) is found a non-permeate outlet port (22) said outlet port designed to withdraw those gases which do not permeate across the membrane from the device. In the case (16) near the first tubesheet (14) is located a permeate outlet port (23), which is adapted for withdrawing the permeate gases from the membrane module. Further illustrated are four bolts (24) which are adapted for securing the first endplate (17) and the second endplate (18) to the casing (16). The tubesheet support means (13) further contains ports or holes (25) in the end near the permeate outlet port (23), such ports or holes are designed to allow the flow of permeate gas through the tubesheet support means (13) to the permeate withdraw port (23). The first tubesheet (14), first endplate (17) and casing (16) form a feed introduction region (26), which is the region into which the feed mixture is introduced, and is adjacent to the face of the first tubesheet (14) to which the one end of the hollow fiber bundle (10) is open, such feed introduction region is adapted to allow the flow of the feed into the bores of the hollow fibers of the bundle (10). A non-permeate exit region (27) is defined by the outside face of the second tubesheet (15), the second endplate (18) and the casing (16). This region (22) functions as the area where the non-permeating gases which exit the hollow fibers flows into and from which the non-permeating gas is withdrawn through the non-permeate outlet port (23). The casing (16) and tubesheet support means are arranged to define a flow space (37) into which the fluid permeating through the hollow fibers flows by ports or holes (25) in the tubesheet support means (13). The permeating fluid is removed from the flow space (37) via the permeate outlet port (23).

Figure 2:
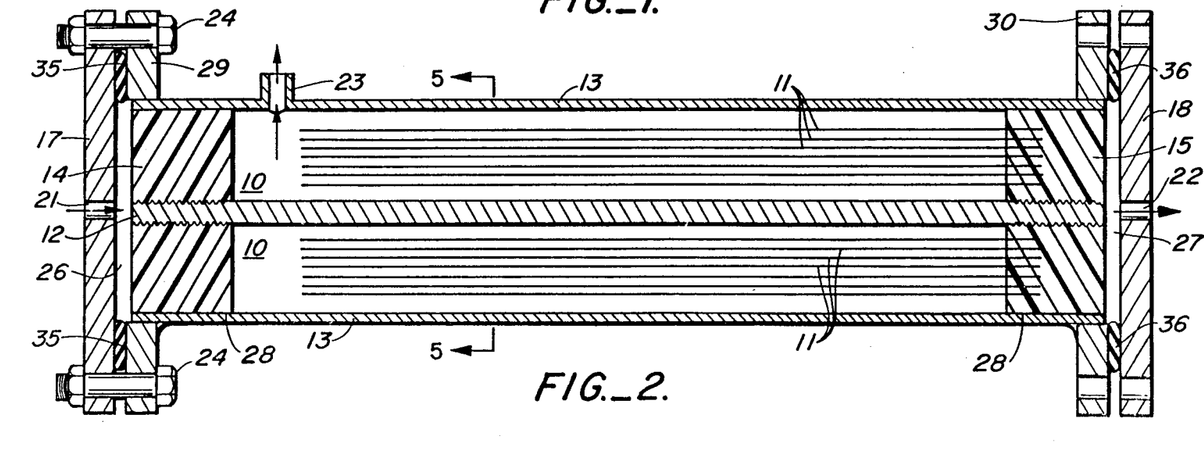
FIG. 2 demonstrates a schematic drawing of a preferred embodiment of the invention wherein the tubesheet support means also functions as the membrane case.

Another embodiment of the present invention is illustrated by FIG. 2. In this embodiment, the tubesheet support means also functions as a casing about the hollow fiber membrane bundle. The device comprises a hollow fiber membrane bundle (10) (the hollow fibers are not shown to make the drawing easier to read) which is arranged about a core (12). The core (12) extends through and is bonded to a first tubesheet (14) and a second tubesheet (15) at either end of the hollow fiber membrane bundle (10). The device further comprises a series of baffles (11) wherein one end of each of the baffles (11) is embedded in the second tubesheet (15) and the second end of the baffles (11) is in the vicinity of the first tubesheet (14) with sufficient distance between said first tubesheet (14) and the baffles (11) to allow the permeating gas to be withdrawn from the module. Arranged about the tubesheets (14) and (15) and the hollow fiber membrane bundle (10) is a tubesheet support means (13) which is bonded to each tubesheet (14) and (15) by resin bonds (28). Welded to each end of the tubesheet support means (13) are flanges (29 and 30). The flanges (29 and 30) are adapted for fixing the first endplate (17) to the end of the module near the first tubesheet (14), and the second endplate (18) near the end of the module near the second tubesheet (15). In the first endplate (17) is a feed inlet port (21) adapted for introducing a mixture of gases to be separated into the module. The gas is introduced into a feed inlet region (26), said region (26) is a cavity surrounded on one side by the outside face of the first tubesheet (14) and on the second side by the first endplate (17). Gaskets (35 and 36) between the flanges (29 and 30) and the first and second endplates (17 and 18), respectively are shown. The feed inlet region (26) is sealed from the outside such that gas cannot communicate into said region other than through the feed inlet port (21). In the second endplate (18) is a non-permeate exit port (22). This non-permeate exit port (22) communicates with the permeate exit region (27), said region being defined by the outside surface of the second tubesheet (15) and the second endplate (18). This region is sealed from the outside such that gas can only communicate into and out of the region via the hollow fibers of the bundle (10) and the nonpermeate exit port (22). Attached to the tubesheet support means (13) at the end of the said tubesheet support means (13) near the first tubesheet (14) is a permeate outlet port (23). This permeate outlet port (23) is used to withdraw the gas which permeates across the membranes into the shellside of the membrane. The endplates (17 and 18) are attached to the flanges (29 and 30) via bolts (24).

Figures 3, 4, 5:
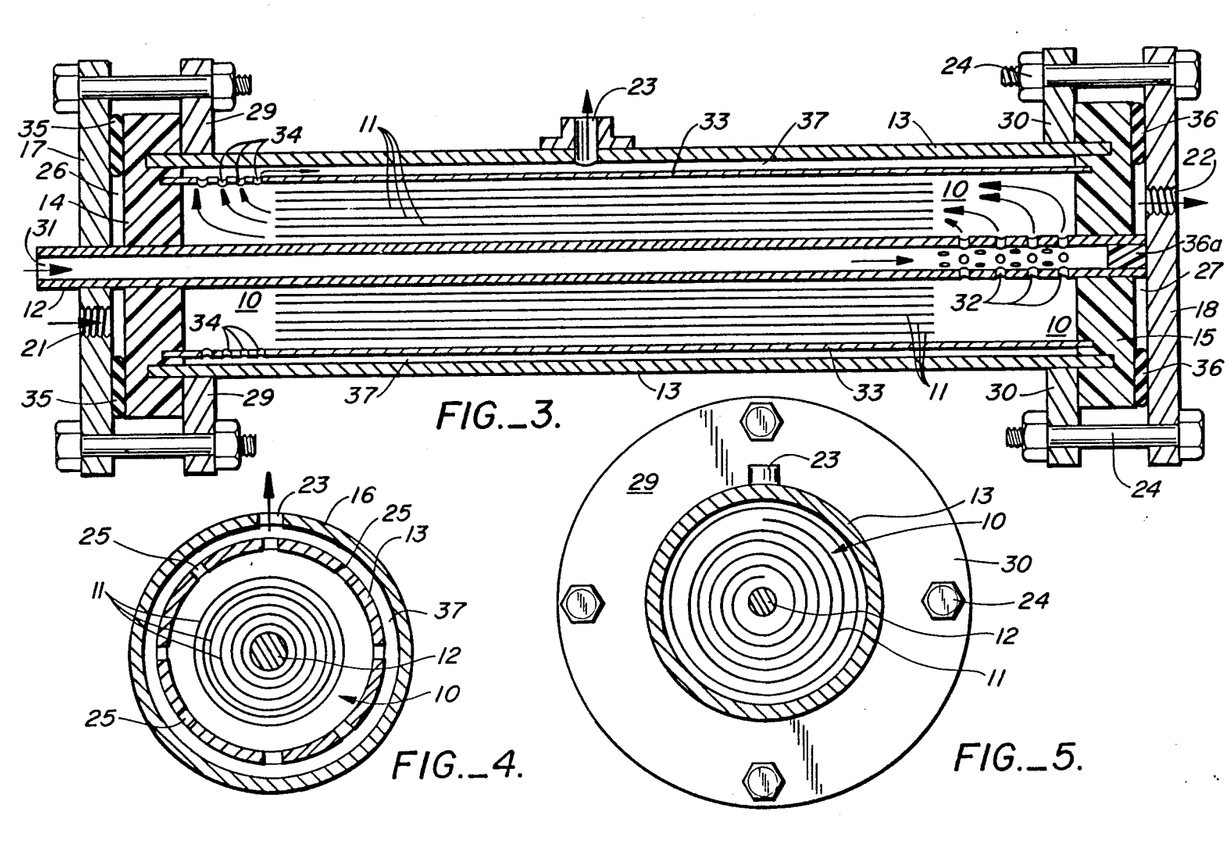
FIG. 3 demonstrates a schematic drawing of a preferred embodiment wherein a sweep fluid is introduced into the hollow fiber bundle from the core.
FIG. 4 is a schematic drawing of a cross-sectional view of a membrane device of this invention in which baffles are arranged in a concentric manner.
FIG. 5 is a schematic drawing of a cross-sectional view of a membrane device of this invention wherein baffles are arranged in a spiral fashion.

Another embodiment of the invention is illustrated by FIG. 3. This embodiment illustrates a module which is adapted for the use of a sweep fluid. The device comprises a hollow fiber membrane bundle (10) (the hollow fibers are not shown to make the drawing easier to read) which is arranged about a core (12). The core (12) extends through and is bonded to a first tubesheet (14) and a second tubesheet (15) at either end of the hollow fiber membrane bundle (10). The core (12) at a first end has a sweep fluid inlet means (31) adapted for introducing a sweep fluid into the hollow fiber bundle (10) via perforations in the core (32). The core (12) is plugged by a plug (36a) at its second end, thereby forcing all the sweep fluid into the hollow fiber membrane bundle (10). The device further comprises a series of baffles (11) wherein one end of each of the baffles (11) is in the vicinity of the second tubesheet (15) with sufficient distance between the second tubesheet (15) and first end of the baffles (11) to allow the sweep fluid to flow from the core tube (12) to the flow channels formed by the baffles (11). The second end of the baffles (11) is in the vicinity of the first tubesheet (14) with sufficient distance between said first tubesheet (14) and the baffles (11) to allow the sweep fluid and permeating gases to flow to the permeate outlet means (23). The bundle is surrounded by an outside baffle (33). This baffle is embedded in the tubesheets (14 and 15) at both ends. Located in the end of the outside baffle (33) nearest the first tubesheet (15) is a series of holes (34) adapted for allowing the permeate fluid and sweep fluid to flow to the permeate outlet port. Holes (34) in the baffles (33) allow the permeating fluid and sweep fluid to be withdrawn from the module. The tubesheet support means (13) and outside baffle (33) are arranged to allow a flow space (37) between them adapted to allow the fluid flowing out of the holes (34) in the outside baffle (33) to flow to the permeate outlet means (23). Arranged about the tubesheets (14) and (15) and the hollow fiber membrane bundle (10) is a tubesheet support means (13) which is embedded in each tubesheet (14) and (15). About each end of the tubesheet support means (13) are slip flanges (29 and 30) such flanges being located inside the built up tubesheets (14 and 15). The flanges (29 and 30) are adapted for fixing the first endplate (17) to the end of the module near the first tubesheet (14), and the second endplate (18) near the end of the module near the second tubesheet (15). In the first endplate (17) is a feed inlet port (21) adapted for introducing a mixture of gases to be separated to the module. The gas is introduced into a feed inlet region (26), said region (26) is a cavity surrounded on one side by the opposite face of the first tubesheet (14) and on the second side by the first endplate (17). The feed inlet region (26) is sealed from the outside such that fluid cannot communicate into said region other than through the feed inlet port (21). In the second endplate (18) is a non-permeate exit port (22). This non-permeate exit port (22) communicates with the permeate exit region (27), said region being defined by the outside surface of the second tubesheet (15) and the second endplate (18). This region is sealed from the outside such that fluid can only communicate into and out of the region via the hollow fibers of the bundle (10) and the nonpermeate exit port (22). Gaskets (35 and 36) are provided between the tubesheets (14 and 15) and the first and second endplates (17 and 18) respectively. Attached to the tubesheet support means (13) is a permeate outlet port (23). This permeate outlet port (23) is used to withdraw the gas which permeates across the membranes into the shellside of the membrane. The endplates (17 and 18) are attached to the flanges (29 and 30) via bolts (24).

FIG. 4 demonstrates a cross-sectional view of the membrane device shown in FIG. 1. A bundle of hollow fibers (10) (the hollow fibers are not shown to make the drawing easier to read) arranged about a core (12), with a series of baffles (11) is arranged in concentric fashion through the bundle (10). About the bundle is the tubesheet support means (13). Further arranged about the tubesheet support means is the case (16). The drawing further illustrates the holes (25) in the tubesheet support means (13) adapted for allowing the fluid to exit the area around the bundle and to enter the flow space (37) between the tubesheet support means (13) and the case (16). The fluid in the flow space (37) is removed via the permeate outlet means (23).

FIG. 5 demonstrates a cross-sectional view of a membrane device like the one depicted by FIG. 2. In this view the fiber bundle (10) (the hollow fibers are not shown to render the drawings easier to read) arranged about the core (12) has interspersed through it a baffle (11) arranged in a spiral fashion. Arranged about the bundle (10) is the tubesheet support means (13). Also illustrated is one flange (30) and four bolts (24) adapted for attaching the end capping means to the module by the flange (30). The fluid permeating through the hollow fiber membranes is removed via the permeate outlet means (23).

In many of these separations, the force which drives the preferentially permeating species across and through the membrane is a pressure differential between the feed side of the membrane and the permeate side of the membrane. Feed side of the membrane refers herein to that side of the membrane to which the fluid mixture from which the desired species is to be separated is contacted. Permeate side of the membrane is that side of the membrane to which the species permeate and on which the stream richer in the preferentially permeating species can be found. Preferably, in the separation of oxygen from nitrogen this pressure differential is between about 90 (620 kPa) and about 250 psi (1720 kPa). In the separation of nitrogen or carbon dioxide from light hydrocarbons or natural gas, the pressure differential across the membrane is between about 280 (1930 kPa) and about 900 psi (6200 kPa). In the embodiment wherein oxygen is separated from nitrogen, the separation can take place at temperatures of between about 0° and about 100° C., more preferably between about 0° and 50° C. In that embodiment where nitrogen or carbon dioxide is separated from light hydrocarbons or natural gas, the separation can take place at temperatures between about −10° and about 120° C.

In membrane stripping operations the operation temperatures are preferably between about 10° and 95° C., the pressure gradient across the membrane is preferably from about 0 to 60 psi. The liquid flow rate down the bore is between about 0 and 0.02 gpm/ft$^2$ surface area and more preferably between about 0 and 0.005 gpm/ft$^2$ of surface area. It is preferable to use a sweep fluid, preferably sweep gas, on the shell side of the membrane. The sweep flow is preferably between about 0 and 0.15 cfm/ft$^2$ surface area, more preferably between about 0 and 0.03 scfm/ft$^2$ of surface area.

Operation of the membrane device can be illustrated by reference to FIG. 2. A mixture of fluids to be separated is introduced via the feed inlet port (21) into the feed inlet region (26) under pressure. The fluids to be separated thus flow down the bores of the hollow fiber membranes in the hollow fiber bundle (10). A portion of the fluids permeates across the membranes into the shellside of the membrane device. The baffles (11) force the permeating fluid to flow countercurrent to the feed flow direction of the fluids. The fluid which does not permeate exits the hollow fibers of the bundle (10) into the permeate exit region (27) and is removed from the device through the permeate exit port (23). The permeate is taken from the shellside of the device through the permeate outlet port (27).

What is claimed is:

1. A fluid separation module comprising:
   A. a plurality of hollow fiber membranes, wherein the hollow fiber membranes are arranged in a bundle form and are adapted for the separation of one or more fluids from one or more other fluids;
   B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;
   C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;
   D. a tubesheet support means which comprises a cylinder which encircles the bundle wherein a first end is bonded to or embedded in the first tubesheet, and a second end is bonded to or embedded in the second tubesheet;
   E. a feed inlet means adapted for introducing a feed mixture of fluids to be separated into the bores of the hollow fiber membranes by contacting the feed mixture with the hollow fiber membranes at the opposite face of the first tubesheet;
   F. a non-permeate outlet means adapted for removing the fluids, which do not permeate through the hollow fiber membranes, from the bore of the hollow fiber membranes at the opposite face of the second tubesheet;
   G. means for removing the fluids which permeate through the hollow fiber membranes from the vicinity of the hollow fiber membranes;

H. a core, about which is arranged the hollow fiber membrane bundle, further arranged such that the core extends through and is bonded to the first tubesheet and the second tubesheet;

I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;

K. one or more means for channeling flow, such means arranged to channel flow of permeate in the longitudinal direction parallel to the core toward the permeate outlet, wherein the means for channeling flow have one end embedded in the second tubesheet and the second end placed at a short distance from the first tubesheet, said distance between the end of the means for channeling flow and the first tubesheet being sufficient to allow the permeate stream flowing along the means for channeling flow to flow to the permeate outlet means;

L. a casing means about the membrane module arranged to encase the entire hollow fiber membrane bundle and the two tubesheets;

M. a means for forming a seal between the first tubesheet means and the casing such that fluid cannot communicate between the feed inlet region and the region between the two tubesheets which is outside of the hollow fibers;

N. a means for forming a seal between the second tubesheet means and the casing such that gas cannot communicate between the non-permeate outlet region and the region between the two tubesheets which is outside of the hollow fibers;

O. a first end capping means arranged for sealing the end of the casing means at the end of the casing means near the first tubesheet, thereby forming the feed inlet region;

P. a second end capping means arranged for sealing the end of the casing means at the end of the casing means near the second tubesheet thereby forming the non-permeate outlet region;

Q. a first attachment means arranged for attaching the first end capping means to the casing means; and R. a second attachment means arranged for attaching the second end capping means to the casing means.

2. A fluid separation module of claim 1 wherein

O. the first end capping means is a first end plate;

P. the second end capping means is a second end plate;

Q. the first attachment means is a first flange attached or formed about the casing near the first tubesheet;

R. the second attachment means is a second flange attached or formed about the casing near the second tubesheet;

wherein the first end plate is fastened to the first flange by one or more fastening means, and the second end plate is fastened to the second flange by one or more fastening means.

3. A fluid separation module of claim 1 wherein the permeate outlet means is located close to the end of the hollow fiber bundle embedded in the first tubesheet.

4. A fluid separation module comprising:

A. a plurality of hollow fiber membranes, wherein the hollow fiber membranes are arranged in a bundle form and are adapted for the separation of one or more fluids from one or more other fluids;

B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;

C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;

D. a tubesheet support means which comprises a cylinder which encircles the bundle wherein a first end is bonded to or embedded in the first tubesheet, and a second end is bonded to or embedded in the second tubesheet;

E. a feed inlet means adapted for introducing a feed mixture of fluids to be separated into the bores of the hollow fiber membranes by contacting the feed mixture with the hollow fiber membranes at the opposite face of the first tubesheet;

F. a non-permeate outlet means adapted for removing the fluids, which do not permeate through the hollow fiber membranes, from the bore of the hollow fiber membranes at the opposite face of the second tubesheet;

G. a means for removing the fluid which permeate through the hollow fiber membranes from the vicinity of the hollow fiber membranes;

H. a core, about which is arranged the hollow fiber membrane bundle, further arranged such that the core extends through and is bonded to the first tubesheet and the second tubesheet;

I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;

O. a first end capping means arranged for forming the feed inlet region adjacent to the opposite face of the first tubesheet;

P. a second end capping means arranged for forming the non-permeate outlet region adjacent to the opposite face of the second tubesheet;

Q. a first attachment means arranged for attaching the first end capping means to the tubesheet support means, the first tubesheet, or both;

R. a second attachment means arranged for attaching the second end capping means to the tubesheet support means, the second tubesheet, or both; and S. one or more means for channeling flow, such means arranged to channel flow of permeate in the longitudinal direction parallel to the core, wherein the means for channeling flow have one end embedded in the second tubesheet and the second end placed at a short distance from the first tubesheet, said distance between the end of the means for channeling flow and the first tubesheet being sufficient to allow the permeate stream flowing along the means for channeling flow to flow to the permeate outlet means.

5. A fluid separation module of claim 4 wherein

O. the first end capping means is a first end plate;

P. the second end capping means is a second end plate;

Q. the first attachment means is a first flange;

R. the second attachment means is a second flange;
wherein the first end plate is fastened to the first flange by one or more fastening means, and the second end plate is fastened to the second flange by one or more fastening means.

6. A fluid separation module of claim 5 wherein the permeate outlet means is located close to the end of the hollow fiber bundle embedded in the first tubesheet.

7. A fluid separation module of claim 6 wherein the means for channeling flow are baffles.

8. A fluid separation module comprising:

A. a plurality of hollow fiber membranes, wherein the hollow fiber membranes are arranged in a bundle form and are adapted for the separation of one or more fluids from one or more other fluids;

B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;

C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;

D. a tubesheet support means which comprises a cylinder which encircles the bundle wherein a first end is bonded to or embedded in the first tubesheet, and a second end is bonded to or embedded in the second tubesheet;

E. a feed inlet means adapted for introducing a feed mixture of fluids to be separated into the bores of the hollow fiber membranes by contacting the feed mixture with the hollow fiber membranes at the opposite face of the first tubesheet;

F. a non-permeate outlet means adapted for removing the fluids, which do not permeate through the hollow fiber membranes, from the bore of the hollow fiber membranes at the opposite face of the second tubesheet;

G. a means for removing the fluid which permeate through the hollow fiber membranes from the vicinity of the hollow fiber membranes;

H. a core, about which is arranged the hollow fiber membrane bundle, further arranged such that the core extends through and is bonded to the first tubesheet and the second tubesheet;

I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;

O. a first end capping means arranged for forming the feed inlet region adjacent to the opposite face of the first tubesheet;

P. a second end capping means arranged for forming the non-permeate outlet region adjacent to the opposite face of the second tubesheet;

Q. a first attachment means arranged for attaching the first end capping means to the tubesheet support means, the first tubesheet, or both;

R. a second attachment means arranged for attaching the second end capping means to the tubesheet support means, the second tubesheet, or both;

S. one or more means for channeling flow, such means arranged to channel flow of permeate in the longitudinal direction parallel to the core; and T. a means for introducing a sweep fluid into the core, wherein the core is constructed and arranged to introduce the sweep fluid into the portion of the module between the first and second tubesheets and outside the hollow fibers, wherein one means of channeling flow encircles the outside of the hollow fiber bundle, wherein the first end is embedded in the second tubesheet, and the second end of such means of channeling flow is located a short distance from the first tubesheet, wherein the distance between the second end of the means for channeling flow and the first tubesheet is sufficient to allow the permeate stream and sweep fluid to flow to the permeate outlet means; and the fluid separation module has at least one more means for channeling flow in the interior of the fiber bundle wherein the first end of such interior means for channeling flow is located near the second tubesheet wherein the distance between the second tubesheet and the interior means of channeling flow is sufficient to allow the sweep fluid to flow into flow channels created by the interior means for channeling flow, and the second end of the means for channeling flow is located near the first tubesheet wherein the distance between the second end and the first tubesheet is sufficient to allow the permeate stream and sweep fluid to flow to the permeate outlet means.

9. A fluid separation module of claim 8 wherein the fluid mixture to be separated comprises a mixture of two or more gases.

10. A fluid separation module of claim 9 wherein the gas mixture to be separated comprises one or more gases selected from the group $H_2$, $O_2$, $N_2$, $CO_2$, and $CH_4$.

11. A fluid separation module of claim 10 wherein the gas mixture to be separated comprises $O_2$ and $N_2$.

12. A fluid separation module of claim 8 wherein the mixture of fluids to be separated are liquids.

13. A fluid separation module of claim 12 wherein the fluid which permeates across the membrane permeates in gaseous or vapor form and is removed from the module in gaseous or vapor form.

14. A fluid separation module of claim 8 wherein the fluid mixture to be separated comprises gases.

15. A fluid separation module of claim 14 wherein the mixture of gases to be separated comprises one or more gases selected from the group comprising $H_2$, $N_2$, $O_2$, $CH_4$, $CO_2$.

16. A fluid separation module of claim 15 wherein the mixture of gases separated comprises $O_2$ and $N_2$.

17. A fluid separation module comprising:
A. a plurality of hollow fiber membranes, wherein the hollow fiber membranes are arranged in a bundle form and are adapted for the separation of one or more fluids from one or more other fluids;
B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;
C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;
D. a tubesheet support means which comprises a cylinder which encircles the bundle and contacts both tubesheets near or at its outer edge;
E. a feed inlet means adapted for introducing a feed mixture of fluids to be separated into the bores of the hollow fiber membranes by contacting the feed mixture with the hollow fiber membranes at the opposite face of the first tubesheet;
F. a non-permeate outlet means adapted for removing the fluids, which do not permeate through the hollow fiber membranes, from the bore of the hollow fiber membranes at the opposite face of the second tubesheet;
G. a means for removing the fluid which permeate through the hollow fiber membranes from the vicinity of the hollow fiber membranes;
H. a core, about which is arranged the hollow fiber membrane bundle, further arranged such that the core extends through and is bonded to the first tubesheet and the second tubesheet;
I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;
J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;
K. one or more means for channeling flow, such means arranged to channel flow of permeate in the longitudinal direction parallel to the core toward the permeate outlet, wherein the means for channeling flow have one end embedded in the second tubesheet and the second end placed at a short distance from the first tubesheet, said distance between the end of the means for channeling flow and the first tubesheet being sufficient to allow the permeate stream flowing along the means for channeling flow to flow to the permeate outlet means;
L. a casing means about the membrane module arranged to encase the entire hollow fiber membrane bundle and the two tubesheets;
M. a means for forming a seal between the first tubesheet means and the casing such that fluid cannot communicate between the feed inlet region and the region between the two tubesheets which is outside of the hollow fibers;
N. a means for forming a seal between the second tubesheet means and the casing such that gas cannot communicate between the non-permeate outlet region and the region between the two tubesheets which is outside of the hollow fibers;
O. a first end capping means arranged for sealing the end of the casing means at the end of the casing means near the first tubesheet, thereby forming the feed inlet region;
P. a second end capping means arranged for sealing the end of the casing means at the end of the casing means near the second tubesheet thereby forming the non-permeate outlet region;
Q. a first attachment means arranged for attaching the first end capping means to the casing means; and
R. a second attachment means arranged for attaching the second end capping means to the casing means.

18. A fluid separation module of claim 17 wherein the permeate outlet means is located close to the end of the hollow fiber bundle embedded in the first tubesheet.

19. A fluid separation module comprising:
A. a plurality of hollow fiber membranes, wherein the hollow fiber membranes are arranged in a bundle form and are adapted for the separation of one or more fluids from one or more other fluids;
B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;
C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;

D. a tubesheet support means which comprises a cylinder which encircles the bundle and contacts both tubesheets near or at its outer edge;

E. a feed inlet means adapted for introducing a feed mixture of fluids to be separated into the bores of the hollow fiber membranes by contacting the feed mixture with the hollow fiber membranes at the opposite face of the first tubesheet;

F. a non-permeate outlet means adapted for removing the fluids, which do not permeate through the hollow fiber membranes, from the bore of the hollow fiber membranes at the opposite face of the second tubesheet;

G. a means for removing the fluid which permeate through the hollow fiber membranes from the vicinity of the hollow fiber membranes;

H. a core, about which is arranged the hollow fiber membrane bundle, further arranged such that the core extends through and is bonded to the first tubesheet and the second tubesheet;

I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;

O. a first end capping means arranged for forming the feed inlet region adjacent to the opposite face of the first tubesheet;

P. a second end capping means arranged for forming the non-permeate outlet region adjacent to the opposite face of the second tubesheet;

Q. a first attachment means arranged for attaching the first end capping means to the tubesheet support means, the first tubesheet, or both;

R. a second attachment means arranged for attaching the second end capping means to the tubesheet support means, the second tubesheet, or both; and S. one or more means for channeling flow, such means arranged to channel flow of permeate in the longitudinal direction parallel to the core, wherein the means for channeling flow have one end embedded in the second tubesheet and the second end placed at a short distance from the first tubesheet, said distance between the end of the means for channeling flow and the first tubesheet being sufficient to allow the permeate stream flowing along the means for channeling flow to flow to the permeate outlet means.

20. A fluid separation module of claim 19 wherein

O. the first end capping means is a first end plate;
P. the second end capping means is a second end plate;
Q. the first attachment means is a first flange;
R. the second attachment means is a second flange;

wherein the first end plate is fastened to the first flange by one or more fastening means, and the second end plate is fastened to the second flange by one or more fastening means.

21. A fluid separation module of claim 20 wherein the permeate outlet means is located close to the end of the hollow fiber bundle embedded in the first tubesheet.

22. A fluid separation module of claim 21 wherein the means for channeling flow are baffles.

23. A fluid separation module comprising:

A. a plurality of hollow fiber membranes, wherein the hollow fiber membranes are arranged in a bundle form and are adapted for the separation of one or more fluids from one or more other fluids;

B. a first tubesheet comprised of a thermoset or thermoplastic polymeric material at the first end of the bundle, arranged such that the hollow fiber membranes are embedded in the first tubesheet and communicate through the first tubesheet and are open on the opposite face of the first tubesheet;

C. a second tubesheet comprised of a thermoset or thermoplastic polymeric material at the second end of the bundle opposite the first end, arranged such that the hollow fiber membranes are embedded in the second tubesheet and communicate through the second tubesheet and are open on the opposite face of the second tubesheet;

D. a tubesheet support means which comprises a cylinder which encircles the bundle and contacts both tubesheets near or at its outer edge;

E. a feed inlet means adapted for introducing a feed mixture of fluids to be separated into the bores of the hollow fiber membranes by contacting the feed mixture with the hollow fiber membranes at the opposite face of the first tubesheet;

F. a non-permeate outlet means adapted for removing the fluids, which do not permeate through the hollow fiber membranes, from the bore of the hollow fiber membranes at the opposite face of the second tubesheet;

G. a means for removing the fluid which permeate through the hollow fiber membranes from the vicinity of the hollow fiber membranes;

H. a core, about which is arranged the hollow fiber membrane bundle, further arranged such that the core extends through and is bonded to the first tubesheet and the second tubesheet;

I. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

J. a non-permeate outlet region adjacent to the opposite face of the second tubesheet arranged to form a cavity into which the hollow fiber membranes introduce fluids which do not permeate the membrane, and from which the non-permeate outlet removes the non-permeating fluids from the module, wherein the non-permeate outlet region is sealed such that fluid can only enter or leave the region through the hollow fiber membranes or the non-permeate outlet means;

O. a first end capping means arranged for forming the feed inlet region adjacent to the opposite face of the first tubesheet;

P. a second end capping means arranged for forming the non-permeate outlet region adjacent to the opposite face of the second tubesheet;

Q. a first attachment means arranged for attaching the first end capping means to the tubesheet support means, the first tubesheet, or both;

R. a second attachment means arranged for attaching the second end capping means to the tubesheet support means, the second tubesheet, or both;

S. one or more means for channeling flow, such means arranged to channel flow of permeate in the longitudinal direction parallel to the core; and T. a means for introducing a sweep fluid into the core, wherein the core is constructed and arranged to introduce the sweep fluid into the portion of the module between the first and second tubesheets and outside the hollow fibers, wherein one means of channeling flow encircles the outside of the hollow fiber bundle, wherein the first end is embedded in the second tubesheet, and the second end of such means of channeling flow is located a short distance from the first tubesheet, wherein the distance between the second end of the means for channeling flow and the first tubesheet is sufficient to allow the permeate stream and sweep fluid to flow to the permeate outlet means; and the fluid separation module has at least one more means for channeling flow in the interior of the fiber bundle wherein the first end of such interior means for channeling flow is located near the second tubesheet wherein the distance between the second tubesheet and the interior means of channeling flow is sufficient to allow the sweep fluid to flow into flow channels created by the interior means for channeling flow, and the second end of the means for channeling flow is located near the first tubesheet wherein the distance between the second end and the first tubesheet is sufficient to allow the permeate stream and sweep fluid to flow to the permeate outlet means.

24. A fluid separation module of claim 23 wherein the fluid mixture to be separated comprises a mixture of two or more gases.

25. A fluid separation module of claim 24 wherein the gas mixture to be separated comprises one or more gases selected from the group $H_2$, $O_2$, $N_2$, $CO_2$, and $CH_4$.

26. A fluid separation module of claim 25 wherein the gas mixture to be separated comprises $O_2$ and $N_2$.

27. A fluid separation module of claim 23 wherein the mixture of fluids to be separated are liquids.

28. A fluid separation module of claim 27 wherein the fluid which permeates across the membrane permeates in gaseous or vapor form and is removed from the module in gaseous or vapor form.

29. A fluid separation module of claim 23 wherein the fluid mixture to be separated comprises gases.

30. A fluid separation module of claim 29 wherein the mixture of gases to be separated comprises one or more gases selected from the group comprising $H_2$, $N_2$, $O_2$, $CH_4$, and $CO_2$.

31. A fluid separation module of claim 30 wherein the mixture of gases separated comprises $O_2$ and $N_2$.

* * * * *

UNITED STATES PATENT AND TRADEMARK OFFICE
CERTIFICATE OF CORRECTION

PATENT NO. : 4,929,259
DATED : May 29, 1990
INVENTOR(S) : Terrence L. Caskey et al.

It is certified that error appears in the above-identified patent and that said Letters Patent is hereby corrected as shown below:

Col. 5, line 63, delete "hydroxynaphthyl)" and insert -- hydroxynaphthyl) --;

Col. 11, line 46, delete "supporting" and insert -- support --;

Col. 11, line 58, delete "end, for end" and insert -- end for end, --;

Col. 16, line 14, delete "cfm/ft$^2$" and insert -- scfm/ft$^2$ --.

Signed and Sealed this

Twelfth Day of May, 1992

Attest:

DOUGLAS B. COMER

*Attesting Officer*   *Acting Commissioner of Patents and Trademarks*